United States Patent Office 3,498,288
Patented Mar. 3, 1970

3,498,288
DEVICE FOR CORRECTING THE MEASUREMENT OF POTENTIALS DETECTED BY CONTACT ELECTRODES
Jacques Max, Pont-de-Claix, and Francis Merdrignac, Grenoble, France, assignors to Commissariat a l'Energie Atomique, Paris, France
Filed Feb. 16, 1967, Ser. No. 621,720
Claims priority, application France, Feb. 22, 1966, 50,627
Int. Cl. A61b 5/04; H03f 3/68, 1/00
U.S. Cl. 128—2.1        1 Claim

ABSTRACT OF THE DISCLOSURE

A device for rapidly correcting the measurement, supplied by an apparatus comprising a continuously operating metering amplifier, of the potential detected in surroundings (e.g. an organ of the human body) by means of two contact electrodes, said device comprising means for resetting the zero of said metering amplifier, and means for compensating the polarization voltage of the contact electrodes in use.

---

The invention relates to a device for correcting the measurement of potential detected in surroundings by means of two electrodes, the device automatically eliminating the errors caused by the polarisation of the electrodes.

The invention can advantageously be applied to medical electricity.

In the field of medicine, electricity can of course be used in two main ways. A current may be injected into the human body for purposes of electrostimulation (for instance, electrophysiotherapy). Alternatively, it may be necessary to measure the potential of a particular organ (potential of action), in which case we are dealing with electrodetection, which may relate, for instance to the brain (electro-encephalography) or the heart (electrocardiography, or study of the potentials set up by the cardiac muscle) or in general to muscular contractions (electromyography). Such measurements of potentials of action are performed by means of contact electrodes which are placed on the patient's skin.

However, such measurements of potential of action supply inaccurate signals to the measuring apparatuses, since the measurements are falsified by a potential drift caused by the polarisation of the contact electrodes, such polarisation being possibly the result of modifications in the patient's skin due, for instance, to sweating. In some cases the potential drift may be considerable and equal to several times the value of the required signal, so that the measurement is spurious. Moreover, the drift may vary greatly from one patient to another.

When lengthy measurements are carried out on a particular organ (for instance, in the case of slow muscular contractions) it is impossible to eliminate the potential drift by the use of a conventional filtering method, as a result of the considerable distortion which is introduced into the signal detected.

The prior art apparatuses for measuring potential of action in medical electrodetection and in general potential detected in surroundings by two electrodes, are formed by a metering amplifier to whose output a measuring apparatus, or cathodic indicator or recording apparatus is connected.

The method hitherto used to compensate for the potential drift caused by the polarisation of the contact electrodes has consisted in applying to the input of the continuously operating metering amplifier, by means of a potentiometer, a bucking voltage which is regulated manually whenever necessary, so as to reintroduce the amplified signal into the operating zone of the amplifier.

FIGURE 1 illustrates this prior art method and shows contact electrodes 1, 2 which are placed, for instance, on a patient's skin, a continuously operating metering amplifier 3 and a potentiometer 4.

The disadvantage of the prior art method is that the manual operation providing the required compensation of the potential drift caused by the polarisation of the electrodes takes too much time, and a process of trial and error has to be adopted which is harmful to the interpretation of the measured or recorded results.

The present invention, which obviates this disadvantage, relates to a device for rapidly correcting the measurement, supplied by an apparatus comprising a continuously operating metering amplifier of the potential detected in surroundings (for instance, an organ of the human body) by means of two electrodes, the device performing the correction by automatically suppressing the errors caused by the polarisation of the electrodes, the device being mainly characterised in that it comprises a negative feedback circuit looped on the continuously operating metering amplifier and formed, on the one hand by an operating amplifier to whose terminals a capacitor is connected and whose input can be connected via a first switch to the output of the continuously operating metering amplifier and via a second switch to a potentiometer, the circuit also comprising an attenuator providing an attenuation which is inversely proportional to the gain of the continuously operating metering amplifier and proportional to the maximum potential drift which is to be corrected, the attenuator being connected to the output of the operating amplifier and the input of the continuously operating metering amplifier, the device being so assembled that, on the one hand the connection of the operating amplifier to the output of the continuously operating metering amplifier enables a bucking voltage to be supplied to the input thereof which compensates any potential difference possibly existing initially between the contact electrodes and therefore initially performs the zero resetting of the continuously operating metering amplifier, and on the other hand the connection of the operating amplifier to the suitably regulated potentiometer enables a bucking voltage to be supplied to the input of the continuously operating metering amplifier, when the contact electrodes are in use, which is adapted to compensate the polarisation voltage of the contact electrodes in use, if such voltage can be considered to vary linearly as a function of time, in which case the operating amplifier acts as a generator of linearly increasing voltage.

The first switch—i.e., the one mounted on the connection of the operating amplifier to the output of the continuously operating metering amplifier—can be controlled manually; however, automatic correction is possible, since the bucking voltage must not be calculated. The first switch can also be controlled automatically, for instance by means of a threshold device connected to the output of the continuously operating metering amplifier.

The threshold device triggers when the absolute value of the output voltage exceeds a certain level. The triggering operates a monostable circuit controlling via a relay the closure of the switch for a time long enough to enable the capacitor to be charged.

Other features and advantages of the invention will be gathered from the following description of a non-limitative exemplary embodiment of the invention, with reference to the accompanying drawings, wherein.

Figure 1:
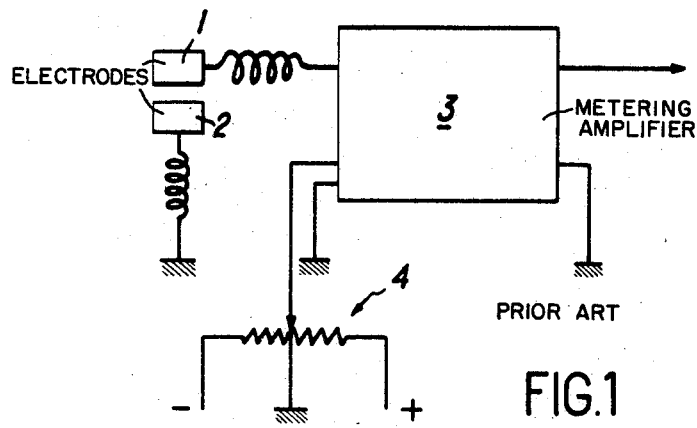
FIGURE 1 shows, as already stated, a prior art circuit.
Figure 2:
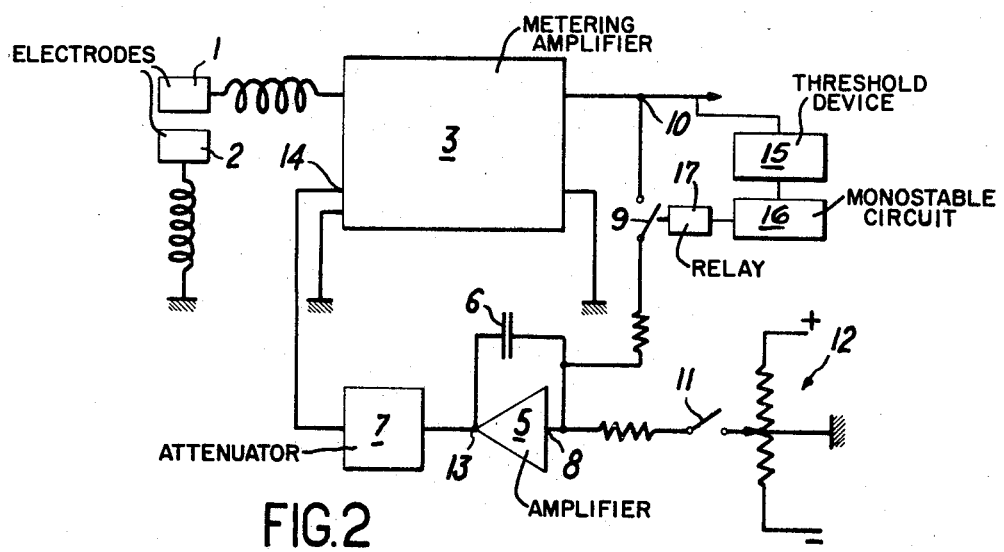
FIGURE 2 shows the device according to the invention, mounted on a continuously operating metering amplifier forming part of an apparatus (not shown) for measuring or recording the potential detected in certain surroundings (for instance an organ of the human body) by means of two contact electrodes.

The prior art circuit shown in FIG. 1 has been described hereinbefore. The device according to the present invention shown in FIG. 2 is represented by a negative feedback circuit looped on a continuously operating metering amplifier 3 and formed by an operating amplifier 5 to whose terminals a capacitor 6 is connected, the circuit also comprising an attenuator 7.

Input 8 of the operational amplifier 5 can be connected via a first switch 9 to output 10 of the metering amplifier 3, and can also be connected via a second switch 11 to a potentiometer 12.

The attenuator 7 is connected to input 13 of the operating amplifier and to the secondary input 14 of the continuously operating metering amplifier 3, which can be, for instance, a differential amplifier.

The first switch can also be controlled automatically, for instance, by means of a threshold device 15 connected to the output of the continuously operating metering amplifier. The threshold device triggers when the absolute value of the output voltage exceeds a certain level. The triggering operates a monostable circuit 16 controlling via a relay 17 the closure of the switch for a time long enough to enable the capacitor to be charged.

The device according to the invention operates as follows:

(a) Zero resetting of the continuously operating metering amplifier 3; the switch 9 is closed; the capacitor 6 connected to the terminals of the operational amplifier 5 is then very rapidly charged in about 0.001 second) to the value of the output voltage of the measuring amplifier 3 which is caused by a potential difference initially existing between contact electrodes 1, 2; a switch 9 is then opened and the said output voltage is applied, after suitable attenuation by the attenuator 7, of the input of the measuring amplifier 3.

This attenuation produced by the attenuator 7 is equal to $\lambda/G$ where $\lambda$ is the ratio of the drift which is to be compensated to the allowable range of the input voltage of amplifier 3, G being the gain of the continuously operating amplifier 3.

This bucking voltage compensates the potential difference initially existing between the contact electrodes 1, 2, and the amplifier 3 is therefore reset to zero.

(b) compensation of the polarisation voltage of the contact electrodes 1, 2 in use:

This polarisation voltage being considered to vary linearly as a function of time, input 8 of the operational amplifier 5 is connected to the potentiometer 12. The operational amplifier 5 acts as a generator of linearly increasing voltage, and the slope of the linear variation, which is selected equal to that of the variation in the polarisation voltage of the electrodes 1, 2, is regulated by the constant voltage applied to the input 8 of the operating amplifier 5, the suitable value of the constant volage being obtained by regulating the potentiometer 12 as required.

The bucking voltage thus supplied to the metering amplifier 3 substantially compensates the polarisation voltage of the contact electrodes 1, 2 in use (for instance, electrodes placed on the body of a patient).

The combination of the two automatic corrections described under (a) and (b) allows the measurement or recording (by means of the apparatus not illustrated which follows the amplifier 3) of the exact required value —i.e., of the potential detected in certain surroundings (for instance an organ of the human body) by means of the contact electrodes 1, 2.

In the field of medicine, the device according to the invention can advantageously be applied to nystagmography (the study of jerky movements of the eyeball), but of course the device can be used generally for electrodetection purposes.

What we claim is:

1. A device for rapidly correcting the measurement of the potential detected in surroundings, as in an organ of the human body, by two contact electrodes connected to a continuously operating metering amplifier having an input, a secondary input and an output, the correction automatically eliminating the errors caused by polarization of the electrodes, comprising a negative feedback circuit looped on the continuously operating metering amplifier, an operational amplifier in said feedback circuit, a capacitor connected across said operational amplifier, an input for said operational amplifier connected to the output of the continuously operating metering amplifier, a switch in said connection, means for automatically actuating said switch, a source of power connected to the input of said operational amplifier, an attenuator connected between the output of said operational amplifier and the secondary input of the metering amplifier, said attenuator providing an attenuation which is inversely proportional to the gain of the continuously operating meteing amplifier and proportional to the ratio of the maximum potential drift to be corrected to the range of input voltage of said metering amplifier, and a threshold device connected to the output of the metering amplifier closing said switch for the time required for charging said capacitor whereby the connection of said operational amplifier to the output of the continuously operating metering amplifier provides a bucking voltage to the input of the operating metering amplifier which compensates any potential difference existing initially between the contact electrodes and initially performs the zero resetting of the continuously operating metering amplifier and the connection of said operational amplifier to said source of power provides a bucking voltage to the input of the continuously operating metering amplifier, when the contact electrodes are in use, compensating the polarization voltage of the contact electrodes.

References Cited
UNITED STATES PATENTS 3,360,374   12/1967   Kimball et al. _____ 330—85

WILLIAM E. KAMM, Primary Examiner

U.S. Cl. X.R.

330—69, 85